Figure 1:
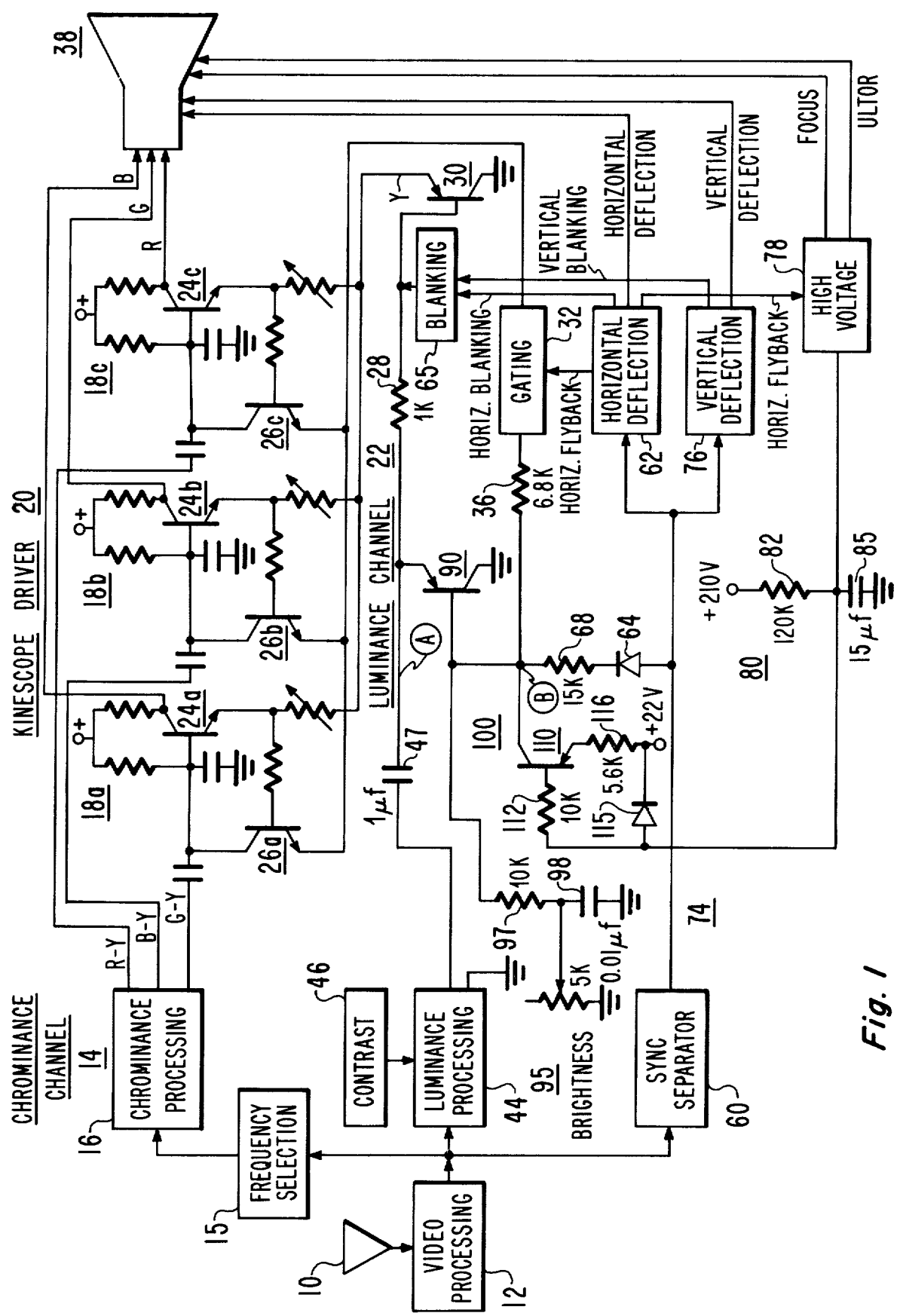

United States Patent [19]

Norman

[11] 4,067,048
[45] Jan. 3, 1978

[54] AUTOMATIC BEAM CURRENT LIMITER

[75] Inventor: Marvin Neil Norman, Indianapolis, Ind.

[73] Assignee: RCA Corporation, New York, N.Y.

[21] Appl. No.: 715,861

[22] Filed: Aug. 19, 1976

[51] Int. Cl.² .............................................. H04N 5/68
[52] U.S. Cl. ...................................... 358/243; 315/30
[58] Field of Search .................. 358/39, 74, 170, 171, 358/243; 315/30

[56] References Cited

U.S. PATENT DOCUMENTS

| 3,619,705 | 11/1971 | Waybright | 358/243 X |
| 3,674,932 | 7/1972 | Griepentrog | 358/243 |

FOREIGN PATENT DOCUMENTS

| 2,021,037 | 11/1971 | Germany | 358/243 |

Primary Examiner—Robert L. Richardson
Attorney, Agent, or Firm—Eugene M. Whitacre; Ronald H. Kurdyla

[57] ABSTRACT

A beam current limiter for a kinescope of a television receiver includes a control transistor, sensing means for providing a control voltage representative of the magnitude of beam current and a clamping network coupled to the sensing means. When beam current is below a predetermined value, the control voltage is clamped to a fixed level such that the transistor is in a first (e.g., non-conductive) condition. When beam current exceeds the predetermined value, the clamping network is disabled and the transistor conducts in response to the control voltage to provide an output signal related to the amount by which the predetermined value is exceeded. In one embodiment of the invention, the output signal is supplied to a second or black level clamping circuit associated with a video amplifier to translate a black or blanking level of a video signal in a direction for causing the kinescope to conduct less beam current.

7 Claims, 7 Drawing Figures

AUTOMATIC BEAM CURRENT LIMITER

This invention relates to apparatus for limiting the electron beam current drawn by an image reproducing device, such as a kinescope of a television receiver.

Excessive beam current may cause a receiver to produce a degraded image. In this regard, excessive beam currents may cause degradation of the performance of the receiver's deflection system, electron beam spot defocusing and picture blooming. Such high beam currents may also exceed the safe operating current capability of the kinescope, possibly causing damage to the kinescope and associated circuit components.

Some examples of circuits for limiting beam current are described in U.S. Pat. Nos. 3,465,095, issued to R. B. Hansen et al.; 3,842,201, issued to Ghaem-Maghami et al.; 3,674,932, issued to D. F. Griepentrog; 3,644,699, issued to W. H. Slavik; 3,619,705, issued to G. C. Waybright; and 3,541,240, issued to E. W. Curtiss.

It is desirable for beam current limiting apparatus to exhibit a fast reaction time in response to excessively high beam current demands of the kinescope. In particular, it is desirable to provide a beam current sensing and control system which is responsive to average beam current levels but, at the same time is capable of responding rapidly to large increases in such average beam current levels.

In accordance with the present invention, a beam current limiting apparatus is provided for a system for processing television signals including a luminance channel for processing luminance signals, a kinescope, and a high voltage supply for providing operating potential for the kinescope. The beam current limiting apparatus includes a sensing circuit for deriving a control voltage representing the magnitude of current drawn by the kinescope from the high voltage supply. An amplifier has an input coupled to the sensing circuit and an output coupled to the luminance channel. Also included is a clamping network coupled to the sensing circuit. The clamping network serves to clamp the control voltage to a reference potential such that the amplifier is in a first conductive condition when the beam current of the kinescope is substantially equal to or less than a predetermined level. When the beam current exceeds the predetermined level, the clamping network is rendered inoperative and the amplifier conduction varies in response to the control voltage, which is no longer clamped. The amplifier then provides an output signal of a magnitude proportional to the amount by which the predetermined level is exceeded, and the luminance component is translated in a direction for proportionally reducing the magnitude of the kinescope beam current toward the predetermined level.

In the drawings:

FIG. 1 shows, partially in block diagram form and partially in schematic circuit diagram form, a general arrangement of a color television receiver employing apparatus constructed in accordance with the present invention; and FIGS. 2-7 show time domain waveforms useful in understanding the arrangement of FIG. 1.

In FIG. 1, there is shown a color television receiver including a video processing unit 12 for receiving radio frequency (RF) signals from an antenna 10 and for translating these signals through intermediate frequency (IF) amplifying and detecting stages (not shown) to provide a composite video signal. The composite video signal comprises chrominance, luminance and synchronization components.

A frequency selection unit 15 selectively couples the chrominance component to a chrominance channel 14, including a chrominance processing unit 16 for processing the chrominance component to derive R-Y, B-Y and G-Y color difference signals. The color difference signals are coupled to respective inputs of kinescope driver stages 18a, 18b and 18c of a kinescope driver 20. The kinescope driver stages combine a luminance output signal, Y, of luminance channel 22 with the R-Y, B-Y and G-Y color difference signals to form R, B and G color signals. The R, B and G color signals are applied to cathode electrodes of a kinescope 38.

Kinescope driver stages 18a, 18b and 18c are similar and each include an amplifier transistor 24a, 24b and 24c, and a bias transistor 26a, 26b and 26c, respectively. The illustrated kinescope driver stages are of the type described in U.S. Pat. No. 3,970,895 granted to D. H. Willis on July 20, 1976.

Video processing unit 12 is also coupled to a channel 74 for processing the synchronizing (sync) component of the video signal. A sync separator 60 derives periodic positive line sync pulses from the video signal. The derived sync pulses (FIG. 6) are in phase with and correspond to line sync pulses of the video signal (FIG. 2) and are coupled to a horizontal deflection unit 62. Appropriate vertical sync pulses are also derived and are coupled to a vertical deflection unit 76. Periodic horizontal and vertical deflection signals are coupled from outputs of units 62 and 76 to appropriate deflection windings associated with kinescope 38. Horizontal deflection unit 62 also supplies negative-going periodic horizontal flyback pulses (FIG. 4) during the sync or retrace interval to a high voltage unit 78, and also provides operating voltages for ultor and focus electrodes of kinescope 38.

Horizontal deflection unit 62 further supplies horizontal flyback pulses to an input of a gating unit 32. Gating unit 32 generates periodic pulses (FIG. 5) during the horizontal retrace interval in response to and nominally coincident with the horizontal flyback pulses. The periodic gating pulses control the operation of bias transistors 26a, 26b and 26c of kinescope driver stages 18a, 18b and 18c during the horizontal retrace interval. The latter operation is described in greater detail in aforementioned U.S. Pat. No. 3,970,895 — Willis.

Figure 2:
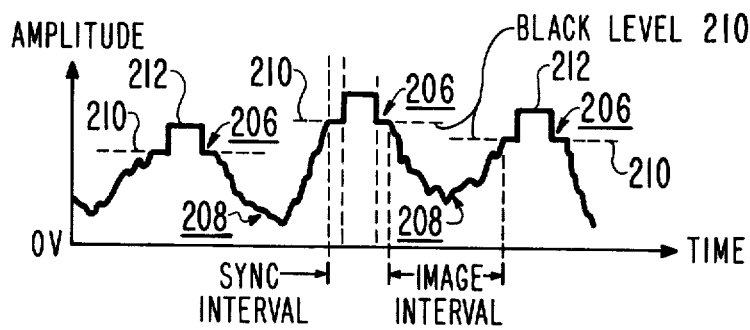

The video signal also is coupled to a luminance processing unit 44 of a luminance channel 22. Luminance processing unit 44 amplifies and otherwise processes the luminance component of the composite video signal to provide a "sync tips positive" luminance output signal as shown in FIG. 2. The luminance component from unit 44 comprises periodic blanking pulses 206 and signal portions 208 representing image information disposed between the blanking pulses. The blanking pulses are formed by a pedestal level 210 upon which are imposed the synchronizing (sync) pulses 212. Although the pedestal level 210 is generally considered to correspond to a blanking level of the kinescope, it is common to refer to this level as the black level, relating to a black tone of an image reproduced by the kinescope.

The luminance component shown in FIG. 2 is coupled from luminance processing unit 44 via a coupling capacitor 47 to an emitter electrode of a PNP clamping transistor 90, and via a resistor 28 to a base electrode of a PNP luminance driver transistor 30. Transistor 90 has a collector-emitter path coupled in parallel with a signal transmission path A of luminance channel 22, and operates as a black level clamp.

Figure 3:
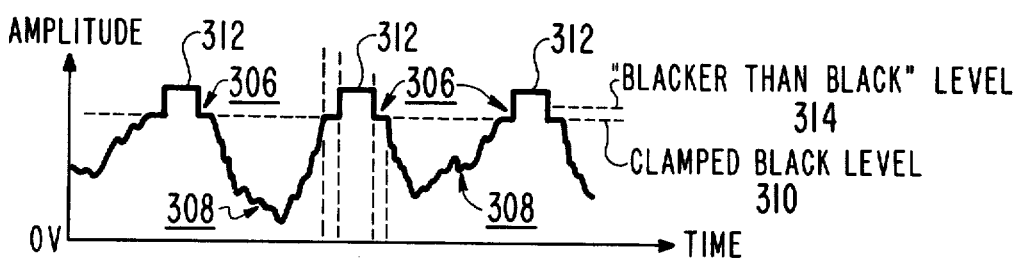
Figure 4:
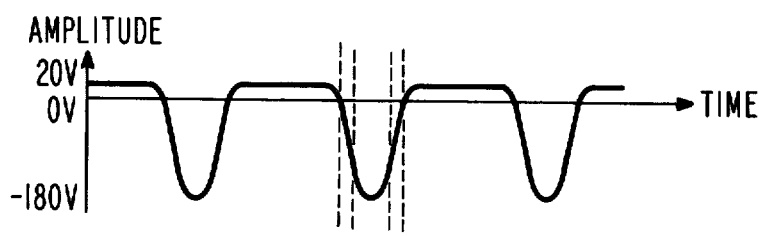
Figure 5:
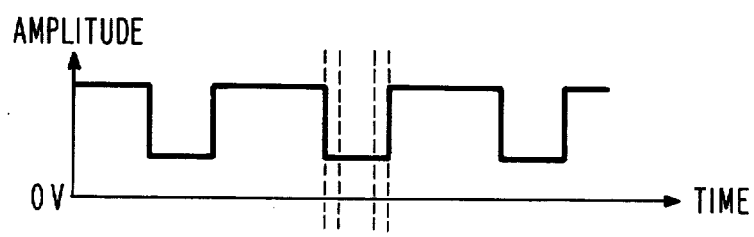
Figure 6:
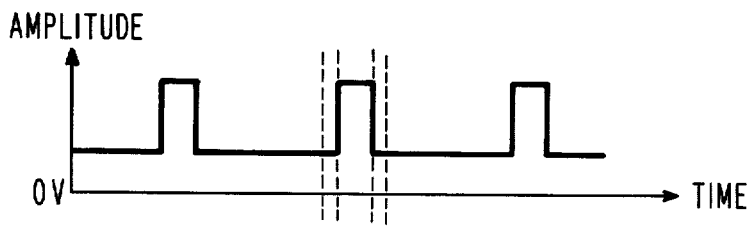
Figure 7:
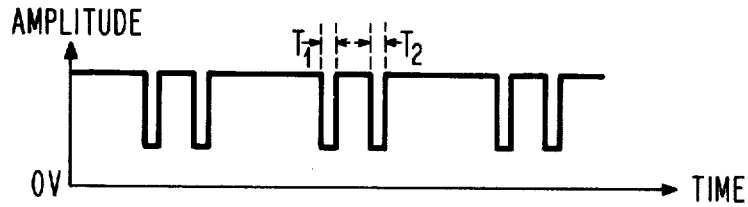

Periodic horizontal sync pulses (FIG. 6) are coupled from sync separator 60 via a resistor 68 and a signal isolation diode 64 to a circuit point B (the base of clamping transistor 90). A resistor 36 couples a second train of periodic pulses (FIG. 5) derived from the horizontal flyback pulses from gating unit 32 to circuit point B. The latter pulses are combined with the sync pulses to form a switching signal (FIG. 7) which controls the clamping (conduction) intervals of clamping transistor 90. A clamped luminance component appearing at the emitter of transistor 90 is shown in FIG. 3.

Horizontal deflection unit 62 and vertical deflection unit 76 also supply periodic horizontal and vertical blanking pulses to a blanking unit 65. The horizontal and vertical blanking pulses from blanking unit 65 are combined with the clamped luminance component (FIG. 3). The combined signal appears at the base electrode of luminance driver transistor 30.

Additional control of clamping transistor 90 is accomplished by beam current limiter circuit 100 and by a brightness control network including a variable resistor 95, a resistor 97 and a filter capacitor 98. Resistor 95 is manually adjustable to vary the base bias of transistor 90 and to thereby obtain a desired level of brightness of an image reproduced by kinescope 38.

The automatic kinescope beam current limiting circuit 100 comprises a clamping diode 115 and a PNP control transistor 110. A collector output of transistor 110 is coupled to the base electrode of clamping transistor 90, and a base input electrode of transistor 110 is coupled via a bias resistor 112 to a beam current sensing circuit 80 associated with high voltage unit 78 as will be described below. An emitter of transistor 110 is coupled to an operating voltage source (+22 volts) via a resistor 116. The +22 volt source provides operating bias for transistor 110 and also provides a clamping reference voltage to diode 115.

Beam current sensing circuit 80 includes a source of direct voltage (+210 volts), a current determining resistor 82 and a filter capacitor 85. Capacitor 85 develops a DC voltage which, during the beam limiting mode of operation, is representative of the beam current drawn by kinescope 38 and is coupled to clamping diode 115 and to the base input of transistor 110 via resistor 112.

In operation, the combined sync pulse-flyback pulse switching signal (FIG. 7) appearing at circuit point B renders normally non-conducting transistor 90 conductive periodically during the so-called front and back porch portions $T_1$ and $T_2$ of each blanking interval. During such operation of transistor 90, capacitor 47 charges so that the black level of the luminance signal component appearing in signal path A is clamped to a level which is greater than the voltage appearing at the base of transistor 90 by one $V_{BE}$ (i.e., the base-emitter voltage drop of transistor 90, or about 0.6 volts).

Brightness adjustment is provided by adjusting the position of the wiper arm of variable resistor 95. Such adjustment causes the direct voltage component of the switching signal appearing at the base of transistor 90 to change, thereby causing the black level of the luminance component to change due to the clamping action of transistor 90. A corresponding change in image brightness results, as described in greater detail in my concurrently filed U.S. patent application entitled "Brightness Control Apparatus", Ser. No. 715,851.

A brightness adjustment is accomplished automatically by kinescope beam current limiter circuit 100 after a predetermined level of kinescope beam current is developed, in the following manner.

Assuming for the moment that no current is drawn by high voltage unit 78, a DC current path exists from the +210 volt source, through resistor 82 and diode 115, to the +22 volt source of circuit 100. A current $(I_M)$ then flowing in this path is determined by the +210 and +22 volt sources, the value of resistor 82 $(R_{82})$, and the voltage drop across conductive diode 115 $(V_D$, or about 0.6 volts) according to the following expression:

$$I_M = [210 - (22 + V_D)/R_{82}]$$

For the circuit values shown, the current flowing through resistor 82 is slightly in excess of 1.5 milliamperes. This value of current, $I_M$, corresponds to a predetermined maximum value of current normally available to high voltage unit 78 and, consequently, relates to a predetermined maximum desired value of kinescope beam current.

During normal operation, the current $I_M$ flowing in resistor 82 is relatively constant and divides between high voltage multiplier 78 and the path including diode 115 and the +22 volt source according to the beam current demand of kinescope 38. When the beam current of kinescope 38 increases such that the current demanded by high voltage unit 78 correspondingly increases, but remains below the threshold value $I_M$, the current then flowing in the path including diode 115 correspondingly decreases. For this condition, the voltage appearing on capacitor 85 is limited (i.e., clamped) to a voltage $V_C$ determined by the +22 volt bias supply of circuit 100 plus the voltage drop across conductive diode 115. The voltage then appearing at the base of control transistor 110 is insufficient to render it conductive.

The voltage limiting or clamping action of diode 115 prevents capacitor 85 from charging above the voltage $V_C$ toward the level of the +210 volt supply when beam current demand is relatively low. If capacitor 85 were allowed to charge substantially above voltage $V_C$ during this time, the time required for capacitor 85 to discharge to a predetermined threshold level for activating beam current limiter 100 would be undesirably long. In that event, the response time of beam limiter 100 to a subsequent high beam current demand of kinescope 38 would be impaired.

It is noted that filter capacitor 85 serves as a sensing device during the beam limiting mode of operation when the current level $I_M$ is exceeded and, additionally, as an integrator for developing a voltage related to average beam current. As will be explained, current limiter 100 is activated by a decrease in the voltage developed on capacitor 85 when the threshold current level is exceeded. Current limiter 100 moreover responds to average beam current demand so that the definition of bright image detail of short term duration is not impaired.

As the magnitude of kinescope beam current further increases toward the maximum level, the current flowing through resistor 82 divides such that the current flowing into high voltage unit 78 increases and the current flowing in diode 115 decreases. As the current demand of high voltage unit 78 approaches the predetermined current level $I_M$, the current flowing in diode 115 approaches zero. An increase in kinescope beam current above the predetermined level results in current for sustaining the conducting of diode 115 to be no longer available and diode 115 ceases to conduct. The voltage drop across resistor 82 increases, and the voltage on capacitor 85, no longer clamped by the operation of diode 115, consequently drops below the $V_C$ clamp voltage level. The reduced voltage appearing on capacitor 85 is in a direction to render transistor 110 conductive.

Increasing conduction of transistor 110 causes the collector current to increase and the collector voltage to increase toward the +22 volt supply. The voltage at the base input of clamping transistor 90 increases accordingly. The increased base voltage of transistor 90 is in a direction to render transistor 90 less conductive when turned on by the switching signal of FIG. 7. The reduced conduction of transistor 90 causes the clamping voltage provided by transistor 90 to increase. As a result, the black level of the luminance component of channel 22 is translated towards a "blacker-than-black" direction to a level 314 as shown in FIG. 3. The magnitude of the average beam current of kinescope 38 decreases in response to the "blacker" level of the clamped luminance component. Accordingly, beam current is proportionally reduced toward the predetermined level.

Beam limiter 100 exhibits a fast response time due to the clamping action of diode 115, which prevents capacitor 85 from charging to an excessively high voltage during scenes of low brightness. Current gain provided by transistor 110 permits a wide range of beam current control.

Although the invention has been described in terms of a specific circuit embodiment, it should be appreciated that other circuit arrangements may be devised by those skilled in the art without departing from the scope of the invention.

What is claimed is:

1. In a system for processing television signals including a luminance component, said system including a luminance channel for processing said luminance component, an image reproducing device, and high voltage supplying means for providing operating potential for said image reproducing device, apparatus responsive to excess current drawn by said image reproducing device comprising:

sensing means for deriving a control voltage representing the magnitude of current drawn by said image reproducing device from said high voltage supplying means;

a control amplifier transistor having an input coupled to said sensing means and having an output coupled to said luminance channel, said transistor exhibiting a threshold conduction level defining first and second conductive conditions; and clamping means, exhibiting a clamping conduction level and operative independent of said transistor, coupled to said sensing means for clamping said control voltage to a reference potential to inhibit undesired excursions of said control voltage in one direction when said current is less than a predetermined level to thereby facilitate a desired response time of said apparatus, such that said control transistor exhibits said first conductive condition when the magnitude of current drawn by said image reproducing device is substantially equal to or less than said predetermined level;

said clamping means being rendered non-conductive and said control transistor exhibiting said second conductive condition when said current exceeds said predetermined level to provide an output signal of a magnitude proportional to the amount by which said predetermined level is exceeded for translating said luminance component in a direction to proportionally reduce the magnitude of said current toward said predetermined level.

2. Apparatus according to claim 1, wherein said sensing means comprises:

a current supply; and capacitive circuit means coupled to said current supply for developing said control voltage.

3. Apparatus according to claim 2, wherein:

said current supply comprises a source of potential and resistive current determining means; and said capacitive circuit means comprises means for developing a control voltage representative of the magnitude of average current drawn by said image reproducing device.

4. Apparatus according to claim 3, wherein:

said clamping means comprises a unilateral current conducting semiconductor device coupled to said control voltage.

5. Apparatus according to claim 4, wherein:

said clamping means comprises a semiconductor diode poled for forward current conduction with respect to said control voltage; and said control transistor has a base input electrode coupled to said control voltage, a collector output electrode and a common emitter electrode.

6. Apparatus according to claim 1, wherein:

said luminance channel includes a clamping network operative during blanking intervals of said television signal for clamping a black level of said luminance component to a reference level; and said output of said control transistor is coupled to said clamping network for altering said reference level in accordance with the magnitude of said control signal in said direction for reducing said current.

7. Apparatus according to claim 6, wherein:

said clamping network comprises a transistor having a main current conduction path coupled to said luminance channel and having an input coupled to said output of said control transistor; and said clamping means comprises a semiconductor diode.

* * * * *